United States Patent [19]

Aoyama et al.

[11] Patent Number: 4,849,882
[45] Date of Patent: Jul. 18, 1989

[54] VECTOR PROCESSING SYSTEM FOR PROCESSING PLURAL VECTOR INSTRUCTION STREAMS

[75] Inventors: Tomoo Aoyama, Hadano; Shun Kawabe, Machida, both of Japan

[73] Assignees: Hitachi, Ltd.; Hitachi Computer Engineering Co., Ltd., both of Tokyo, Japan

[21] Appl. No.: 87,603

[22] Filed: Aug. 20, 1987

[30] Foreign Application Priority Data

Aug. 22, 1986 [JP] Japan .................................. 61-195473

[51] Int. Cl.⁴ ..................... G06F 15/347; G06F 15/16
[52] U.S. Cl. .................................... 364/200; 364/736; 364/228.3; 364/232.21; 364/244.8; 364/228.9
[58] Field of Search ... 364/200 MS File, 900 MS File, 364/736

[56] References Cited

U.S. PATENT DOCUMENTS

| | | | |
|---|---|---|---|
| 4,172,287 | 10/1979 | Kawabe et al. | 364/736 |
| 4,620,275 | 10/1986 | Wallach et al. | 364/200 |
| 4,633,389 | 12/1986 | Tanaka et al. | 364/200 |
| 4,641,275 | 2/1987 | Hatakeyama et al. | 364/900 |
| 4,685,076 | 8/1987 | Yoshida | 364/736 |
| 4,757,444 | 7/1988 | Aoyama et al. | 364/200 |

FOREIGN PATENT DOCUMENTS 0123509 of 1984 European Pat. Off. .

OTHER PUBLICATIONS

T. Cheung, J. E. Smith, A Simulation Study of the CRAY X-MP Memory System, Jul. 1986, IEEE Computer, vol. C-35, pp. 613-622.

*Primary Examiner*—Raulfe B. Zache
*Assistant Examiner*—Glenn Richman
*Attorney, Agent, or Firm*—Fay, Sharpe, Beall, Fagan, Minnich & McKee

[57] ABSTRACT

A vector processor has a plurality of vector processing units each of which is connected to main storage via a plurality of memory port logic units. Each of the vector processing units has a resource management circuit, thereby managing its resources and the plurality of memory port logic units as resources and reporting information of the memory port logic unit determined to be used to other vector processing units. The plurality of memory port logic units are thus shared by the plurality of vector processing units.

4 Claims, 3 Drawing Sheets

VECTOR PROCESSING SYSTEM FOR PROCESSING PLURAL VECTOR INSTRUCTION STREAMS

BACKGROUND OF THE INVENTION

This invention relates to a multiple vector processor and, more particularly, to a multiple vector processor in which memory port logic units of main storage are shared.

Multiple vector processing apparatuses having memory ports provided corresponding to their processors are discussed in "A Simulation Study of the CRAY X-MP Memory System" (by T. Cheung and J.E. Smith, IEEE Transactions on Computers Vol. C-35, No. 7, July 1986), "CRAY-2 Super Computer with 2G Bytes Main Storage and Fluid Cooling System" (by K. Terauchi, Nikkei Electronics, Dec. 16, 1985), and European Patent Publication No. 123, 509).

The meaning of the term memory ports used herein differs from that used in conventional general purpose computers. This difference will first be clarified.

In a general purpose computer, the space in main storage is divided into a plurality of partial spaces which are called "memory ports" and which serve as logical units for receiving main storage access requests issued from an instruction processing unit incorporated in the general purpose computer. Therefore, the memory ports are not managed on the basis of "meanings" such as possibility or impossibility of instruction processing. For the instruction processing unit of a general purpose computer, the memory ports are portions for receiving requests for access to main storage, and are always operative.

On the other hand, the above-mentioned memory port logic units are logical circuits having the following functions:

1. a function of generating a series of addresses for reading vector data from or writing vector data into main storage; and
2. a function of effecting the above function in response to a vector instruction (e.g., a vector load instruction).

Therefore, they are not passive units for receiving main storage access requests, like the memory ports of a general purpose computer, but are active units which generate the series of addresses needed to realize the processing operations demanded by an instruction and issue access requests to main storage when they receive an instruction. For this reason, the name "requestor" is often used for a "memory port" of a vector processor. In this description of the present invention, the name "memory port logic unit" will be used so as to follow precedent and at the same time to allow a distinguishment to be made between the present use and use as made with general computers.

Since the operation of a memory port logic unit of a vector processor is defined by an instruction and is started in response to the commencement of the processing of the instruction, a mechanism which manages the state of the memory port logic unit must be provided in the vector processor in order to enable this kind of logical operation. The word "management" is not used herein to mean that memory ports in a general purpose computer "manage" main storage access requests. It represents the "management" which provides one of the factors of a decision as to whether a vector instruction which accesses main storage can be executed in the vector processor at a certain timing.

When a vector processor, or a multiple vector processor constituted by a plurality of vector processing devices, is designed to improve the capacity of vector processing, it is necessary to increase the number of memory port logic units correspondingly.

On the other hand, the logic of main storage needs to be single from restriction imposed by the language specification. The increase in the number of memory port logic units means an increase in the load on the logical unit which determines the priority order of a plurality of memory port logic units relative to one interleaved bank in main storage.

In existing vector processors, the peak data processing speed is in a range in excess of 1 GFLOPS. This means that the data processing speed of a circuit for determining the priority order of memory port logic units must be of the order of gigawords.

If the necessary number of vector arithmetic units are arranged parallel to each other in order to enable a processing speed of the order of 10 GFLOPS by the multiprocessing of the vector processing devices, the processing speed of the vector processing units can be made to reach the desired level. However, it is not possible for circuits for determining the priority order of memory port logic units to be arranged in parallel, and it is therefore difficult to ensure the data processing speed demanded by the vector processing units.

As a result of the fact that a storage control unit have become incapable of following the improvements in processing speed of vector processing units, a certain type of multiple vector processor has been designed to have local memories in vector processing units. If such an architecture is adopted, the throughput of the vector processing units and the main storage device can be made smaller than that of the arrangement using no local memories, but on the other hand, the amount of hardware required for managing data transmission between local memories and the main storage device is increased. In particular, as the number of vector processing devices increases, the amount of hardware required for the data transmission management increases further. Therefore, a multiple vector processor having an architecture in which local memories are each provided in vector processing devices is designed in such a manner that the local memories are indicated in the language specifications and data transmission is effected between the main storage device and the local memories on the user's responsibility. In this system, the amount of hardware is not increased, but the singlestorage hierarchy which has been preserved by the conventional language specification is destroyed. For this reason, the user must make sacrifices concerning the compatibility of programs, facility of algorithm description, and so forth.

SUMMARY OF THE INVENTION

It is therefore an object of the present invention to provide a vector processing device in a multiple vector processor which has memory port logic units capable of ensuring a higher processing speed.

To this end, the present invention provides a multiple vector processor having a plurality of memory port logic units shared by a plurality of vector processing units, and a plurality of resource management circuits which manage even the busy statuses of the memory port logic units. Each of the resource management circuits reports information on a memory port logic unit which has been determined to be used to other resource management circuits.

When a vector processing unit $P_O$ in the multiple vector processor issues a main storage access request, the resource management circuit adapted for this processing unit decides whether the main storage access request can be issued to a memory port logic unit. If the issue of the main storage access request is possible, the resource management circuit in the vector processing unit which has issued the request stores the fact that the memory port logic unit has become busy, and sets busy information in portions of the resource management circuits of the other vector processing units where the statuses of memory ports are retained.

When the processing of the memory port logic unit is completed, the resource management circuit resets the busy information on the memory port logic unit. The memory port information in other resource management circuits is also reset in the same manner.

The provision of control and communication paths between the resource management circuits arranged as described above makes it possible for a plurality of vector processing units to use the memory port logic units by sharing them.

DESCRIPTION OF THE PREFERRED EMBODIMENT

Figure 1:
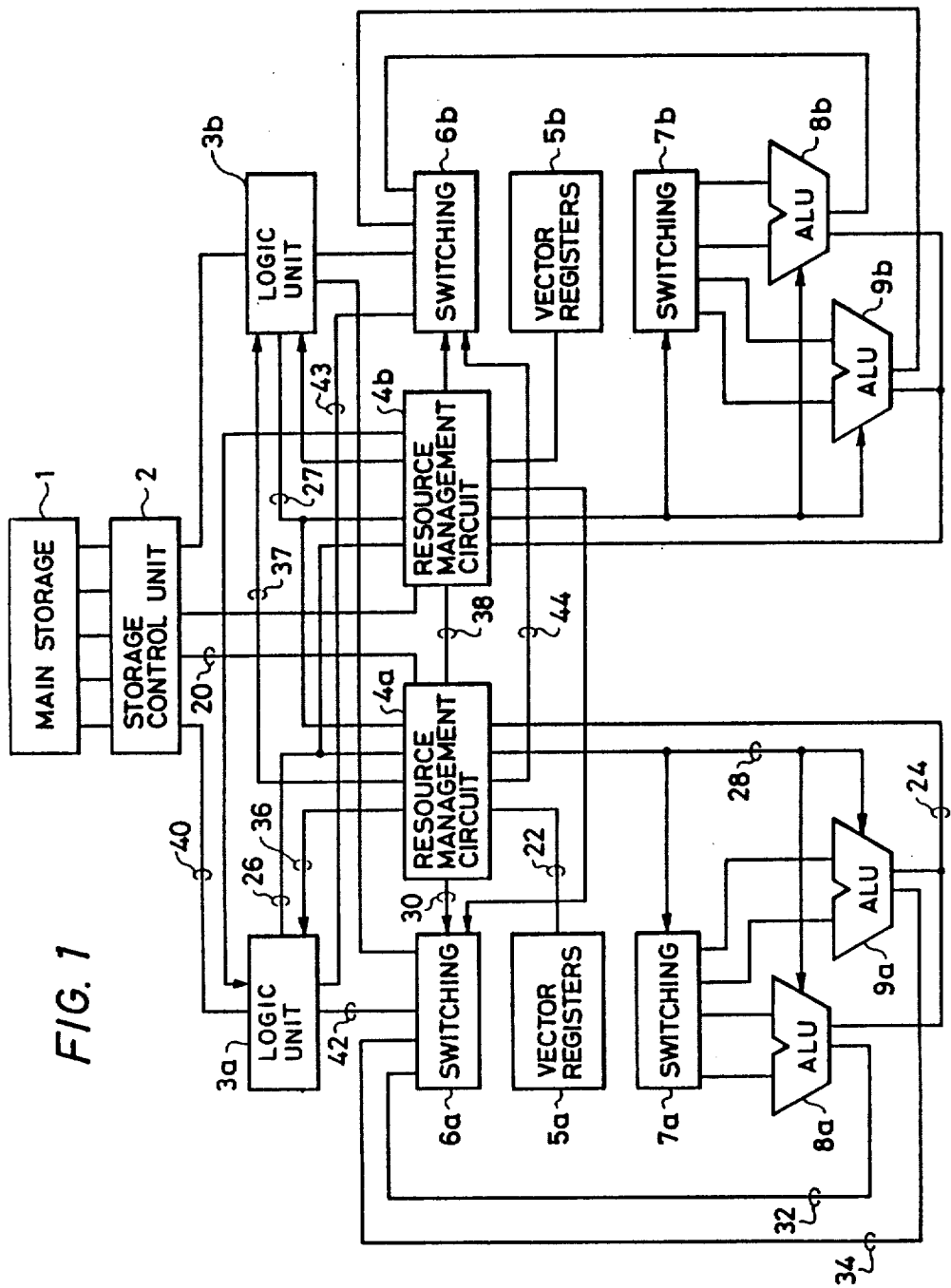
FIG. 1 is a block diagram of an embodiment of the present invention.

An embodiment of the present invention will be described below with reference to the accompanying drawings. FIG. 1 is a schematic block diagram of a multiple vector processor in accordance with the present invention. In order to simplify the description, the multiple vector processor is assumed to have two vector processing sections. As shown in FIG. 1, the processor has main storage 1, a storage control unit 2, memory ports 3, resource management circuits 4, vector registers 5, switching circuits 6 and 7 and arithmetic and logic units (ALU) 8 and 9. Letters a and b which are attached to the logic circuits shown in FIG. 1 correspond to two systems constituted by the two vector processing sections which will be hereinafter sometimes referred to as "system a" and "system b". The vector processing sections are started by scalar processing unit. This starting system is not specifically related to the scope of the present invention and, therefore, the scalar processing unit and starting paths of this processing unit are omitted in FIG. 1.

When, in the arrangement shown in FIG. 1, a resource management circuit 4a is started by the scalar processing unit, the resource management circuit 4a reads out of a series of vector instructions which are sent to the resource management circuit 4a via a path 20.

The resource management circuit 4a is informed of the status of vector registers 5a via a path 22 and is informed of the status of arithmetic and logic units 8a and 9a via a path 24 which is provided in the form of a bundle of wires. The resource management circuit 4a is also informed of the status of a memory port logic unit 3a via a path 26 and the status of a memory port logic unit 3b via a path 27. That is, the resource management circuit 4a in the system a operates to manage the status of the vector registers, the arithmetic and logic circuits and the memory port logic unit in the system a, and the status of a memory port logic unit 4b in the system b. The resource management circuit in the system b operates to manage the vector register, the arithmetic and logic units and the memory port logic unit in the system b, and the memory port logic unit 4a in the system a.

If a vector instruction which has been sent to the resource management circuit 4a via the path 20 is an instruction to make use of an arithmetic and logic unit, the arithmetic and logic circuit to be used is started via a path 28 unless the arithmetic circuits are not all busy. Simultaneously, switching circuits 7a and 6a are instructed via paths 30 and 28, so that a data path is formed between the vector registers and the started arithmetic and logic circuit. An item of data on the vector registers is input into the arithmetic and logic circuit, and the results of calculation are written into the vector register 5a.

If all of the arithmetic circuits in the system a are busy, the vector instruction stays in the resource management circuit 4a, and the starting operation is not effected by this vector instruction until the released state of the arithmetic circuit is reported to the resource management circuit 4a via the path 24.

If a vector instruction which has been sent to the resource management circuit 4a is an instruction to make use of the memory port logic units, the management circuit 4a examines the status of the memory port logic units in the systems a and b via the paths 26 and 27. If the memory port logic units are not all busy, the memory port logic units in the systems a and b are respectively made to start via paths 36 or 37. Simultaneously, busy information on the memory port logic unit is set in the resource management circuit 4b in the system b via a path 38 (which is a bidirectional path). The operation decoding cycles in the memory management circuits in the systems a and b are controlled such that they are not effected at the same time. These operations ensure that the management of the memory port can be effected by the same logical operation as that of the management circuit 4a in the system a even when a vector instruction to access main storage is decoded by the resource management circuit 4b in the system b.

If the started memory port logic unit is 3a and if the instruction is a load instruction, the memory port logic unit 3a reads out vector data from main storage 1 via a path 40 and, if the vector register into which the data thereby read out should be written is one in the system 2, writes this vector data into the vector register 5a via a path 42. At this time, the resource management circuit 4a directs via the path 30, and a path connection is effected between the path 42 and the vector register 5a. If the vector register into which the data should be written is one in the system b, the vector data is written into the vector register 5b from the memory port 3a by way of a path 43. At this time, the switching circuit 6b is instructed via a path 44 to form connection between the path 43 and the vector register 5b.

If a vector instruction to be processed at the memory port 3a which has been started is a store instruction and if store data has been stored in the vector register 5a, this store data is sent to main storage 1 through the switching circuit 6a via the path 42 and is then written into main storage 1 by way of the path 40. If the store data has been stored in the vector register 5b, the store data is written through the switching circuit 6b into main storage 1 by way of the path 43, memory port logic unit 3a and the path 40.

A similar process is effected in the case where the started memory port is 3b.

As described above, vector processing is effected while the vector processing sections are sharing the memory port logic units which belong to these sections.

Figure 2:
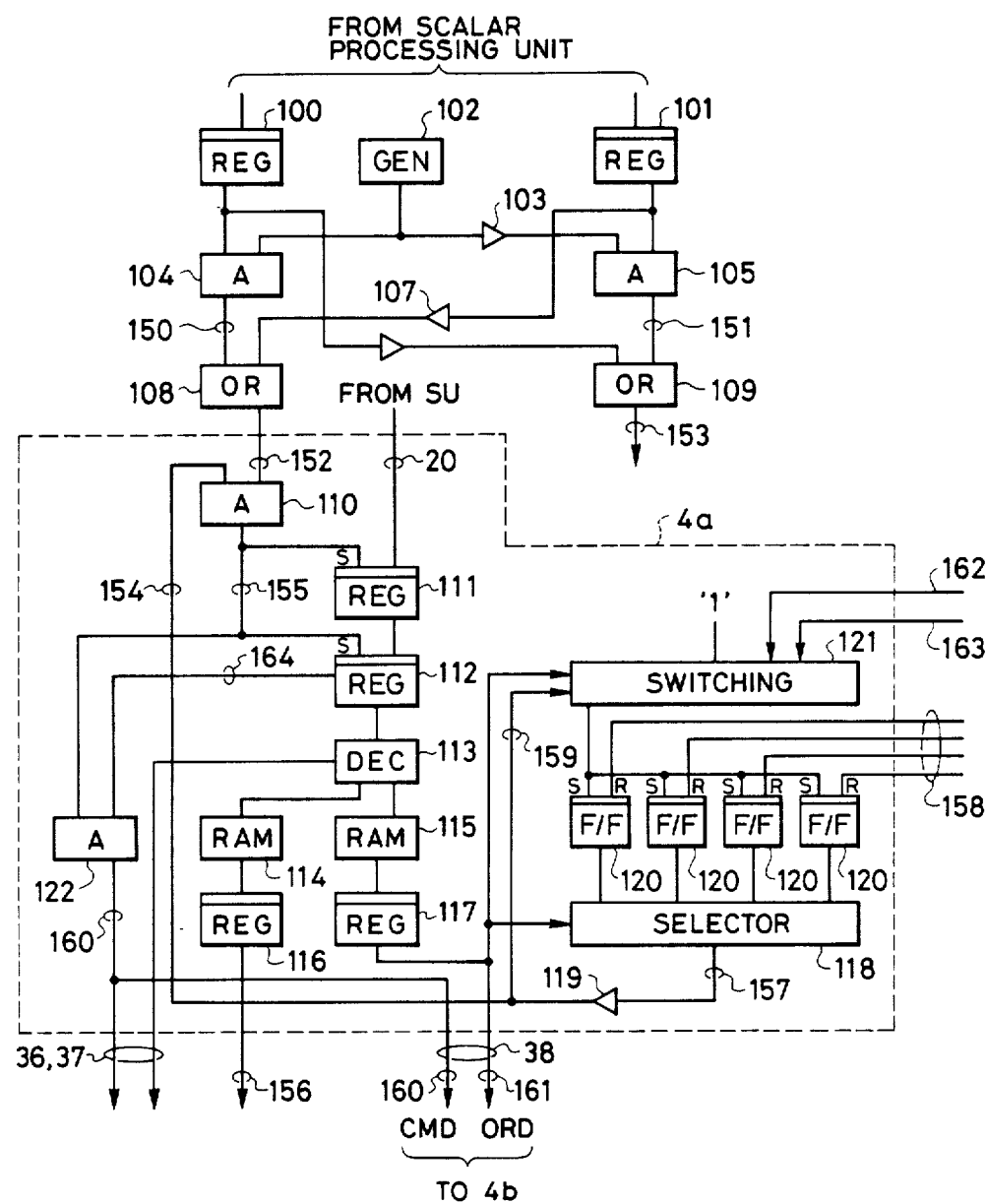
FIG. 2 is a block diagram of an example of the resource management circuit shown in FIG. 1.

FIG. 2 is a block diagram of the resource management circuit 4a shown in FIG. 1. In FIG. 2, portions in the area encircled by the broken line belong to the resource management circuit 4a, and other portions are shared by this and the resource management circuit 4b in the system b. When the vector processing section in the system a is started by the scalar processing unit of the multiple vector processor, a register 100 is set to '1'. When the vector processing section in the system b is started, a register 101 is set to '1'.

A logic circuit 102 is a generator which alternately outputs signal values '1' and '0' with a certain constant period. Generally, the period is set in correspondence with a machine cycle.

The output from the generator 102 is input into an AND gate 104. In the AND gate 104, the logical product of the output from the register 100 and the output from the generator 102 is obtained, and a timing signal which enables the statuses of resources to be examined by the resource management circuit 4a in the system a is supplied on a path 150. On the other hand, the output from the generator 102 is inverted by the inverter 103, the logical product of the signal thereby inverted and the output of the register 101 is obtained by an AND gate 105, and a timing signal which enables the statuses of resources to be examined by the resource management circuit 4b in the system b is supplied onto a path 151. The output of the register 101 is inverted by an inverter 107, and the logical add of the signal thereby inverted and the signal on the path 150 is obtained by an OR gate 108. By the formation of this logical add, timing which has been assigned to the system b by the generator 102 is assigned as the timing of the operation of the resource management circuit 4a in the system a, when the system b is not started by the scalar processing unit. Similar processing is performed by an OR gate 109 with respect to the system b, thereby supplying a timing signal for operating the resource management circuit 4b in the system b onto a path 153.

The operation of the resource management circuit of the vector processing section which forms the system a will be described below. The logic related to this operation corresponds to the portion encircled by the broken line in FIG. 2.

A timing signal for operating the resource management circuit 4a in the system 1 has been supplied onto a path 152. This signal is supplied onto a path 155 via an AND gate 110 (the signal value on the path 154 is assumed to be '1' in the initial state) and serves as a setting signal for registers 111 and 112 in which vector instructions have been stored. The input path of the register 111 corresponds to the path 20 shown in FIG. 1, and the storage control unit 2 serves as a source. Vector instructions proceed on the registers 111 and 112 by the setting signal on the path 155.

A vector instruction which has been stored in the register 112 is decoded by a decoder 113. By using results of the decoding, a RAM 115 in which a table of resources (a generic name of arithmetic and logic circuits and memory ports) needed to execute the instruction is stored is referred to, and, the results of reference are obtained in a register 117. Simultaneously, the results from the decoder 113 are used to refer to a RAM 114 in which information related to the path connection of the switching circuits (components 6a and 7a in FIG. 1) at the input and output of the vector register necessary for the execution of the instruction has been set, and the results are obtained in a register 116. The output from the register 116 is supplied onto a path 156. This path is provided as a bundle of wires and corresponds to the paths 30 and 20 shown in FIG. 1.

The output from the register 117 serves as a selection signal of the selector 118. Flip-flops 120 are adapted for the resources of the vector processing section so as to retain the status of each resource including the statuses of the memory port logic units 3a and 3b. That is, if the value of the flip-flop is '1', the status of the corresponding resource is 'busy'. If it is '0', the status of the corresponding resource is 'empty'. For facilitating the description, only four resources of the vector processing section are shown in FIG. 2, but selection of the number of resources is not essential for the resource management circuit.

If the value which represents the status of a resource selected by the selector 118 is '1', this resource is busy. In this case, the signal value is inverted by an inverter 119 after passing through a path 157 and is thereafter output onto the path 154. The logical product of this signal value and the timing signal on the path 152 is obtained by the AND gate 110 and is supplied to the path 155, thereby inhibiting the procession of vector instructions on the registers 111 and 112.

The flip-flops 120 are reset by resource freeing signals supplied via paths 158 which corresponds to the paths 22, 24, 26 and 17 shown in FIG. 1.

If the output value from the selector 118 is '0' and the resources for executing the vector instruction are empty, the output from the inverter 119 becomes '1', thereby effecting the procession of vector instructions on the registers 111 and 112. A signal on a path 159 represents an enable status of a switching circuit 121, and a signal value '1' is used to set the value of the flip-flop 120 corresponding to the resource for executing the vector instruction to be '1'. If the output value from the selector 118 is '1', the signal value on the path 159 becomes '0', the flip-flop 120 is not set by the switching circuit 121. The wires 158 are provided in order to reset each flip-flop in response to the empty status of the resource. The operations of the resource management circuit in the system a are thus performed.

If the vector instruction requires the use of the memory port logic units it is necessary to set flip-flops provided in the resource management circuit in the system b in parallel with the setting of the flip-flops in the system a. The correspondence of the flip-flops of the resource management circuit in the system b to the resources is the same as that in the case of the resource management circuit in the system a. That is, if the decoder decodes a vector instruction which requires the use of the memory ports, a signal value '1' is output onto a path 164. The signal on the path 164 is input into an AND gate 122, and the logical product of this signal and a signal on the path 155 is thereby obtained. The signal on the path 155 has the resource management timing of the system a and indicates the case where the vector instruction has been judged to be executable by the resource management circuit 4a in the system a.

Therefore, the output from the AND gate 122 serves as a designation signal CMD for setting the flip-flops in the resource management circuit which correspond to the resources. This designation signal is sent to the resource management circuit 4b in the system b via a path 160. The output from the register 117 represents order information ORD on which flip-flop in the resource management circuit 4b in the system b should be set. The paths 160 and 161 shown in FIG. 2 correspond to the path 38 shown in FIG. 1. Wires 162 and 163 are adapted for supplying CMD and ORD from the resource management circuit 4b. The transmission of instructions from the resource management circuit 4a to each of the memory ports is effected via the path 36 or 37.

Figure 3:
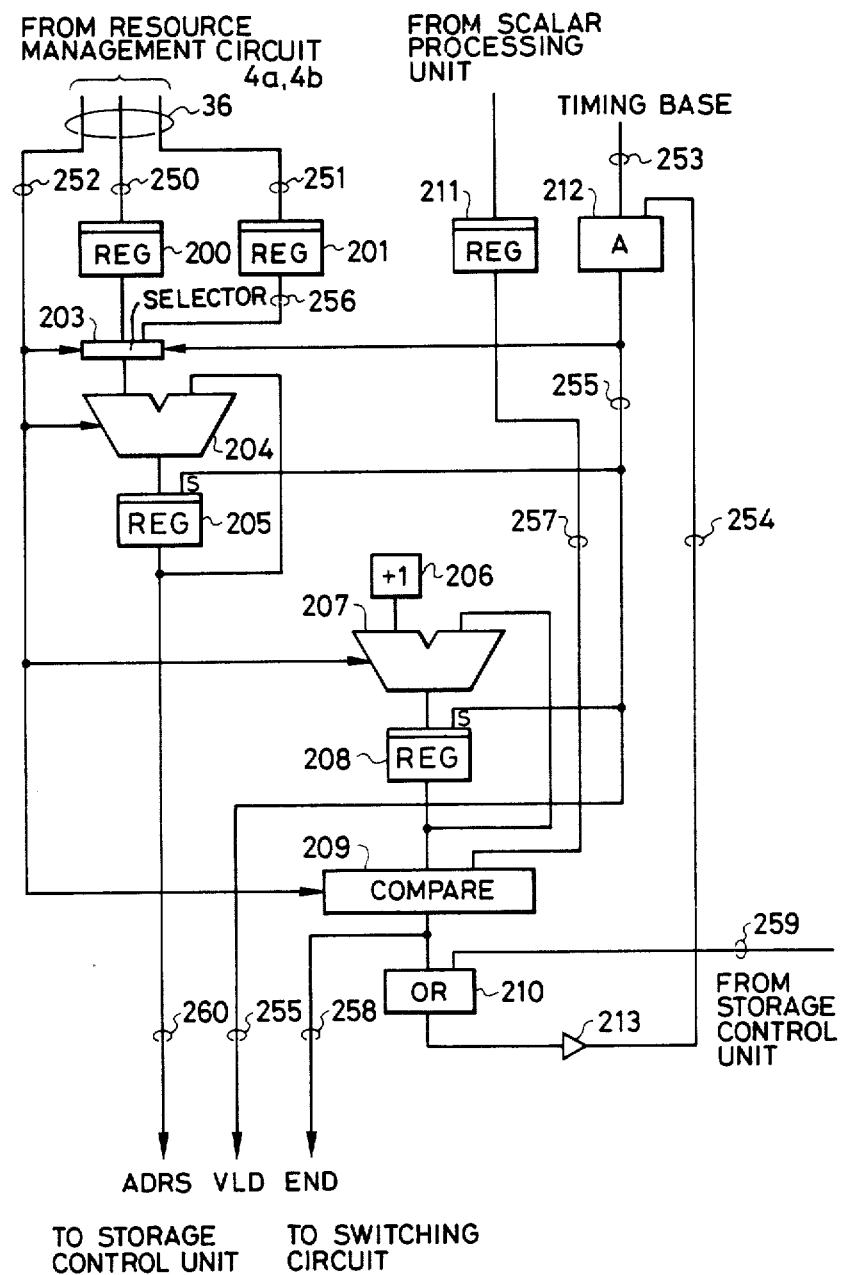
FIG. 3 is a block diagram of an example of the memory port shown in FIG. 1.

FIG. 3 is a block diagram of a logical section for generating a series of address for reading out vector data in main storage which represents an example of the memory port in accordance with the present invention.

As shown in FIG. 3, when a vector instruction is decoded and judged to be executable and when the addressing system for reading out main storage is decoded, order information is supplied from the decoder 113 of the resource management circuit 4a shown in FIG. 1 via paths 250 and 251 and is set in the register 200 and 201. It is assumed here that the information in the register 200 represents the base addresses of items of vector data in main storage while the information in the register 201 represents the stride between the items of vector data. These two categories of information enable the designation of data on consecutive vectors and constant stride vectors in main storage. When the registers 200 and 201 are set, the resource management circuits 4 shown in FIG. 1 directs, via a path 151 "the memory port logic unit" shown in FIG. 3 to start. This means that the processing based on the vector instruction is commenced by the vector processor.

A starting signal on the path 252 which is output from the AND gate 122 resets a selector 203, an adder 204, a counter 207 and a comparator circuit 209. This starting signal lasts for one machine cycle. After one machine cycle of this resetting operation, the information in the register 200 is supplied via the adder 204 and is set in a register 205. It is assumed here that a valid signal is transmitted on a path 253 every machine cycle and that the value of a signal on a path 254 is set to '1' in response to the start, that is, the reset of the memory port logic unit. The logical product of the signal values on the paths 253 and 254 is obtained by an AND gate 212 and is supplied onto a path 255. Therefore, the signal value on the path 255 one machine cycle after the resetting operation is '1'. The register 205 is set by this signal. The selector 203 connects a path 256 and the adder 204 when the signal value on the path 255 becomes '1'. In this manner, the address value in the register 205 and the stride value between vector elements are added to each other and set in the register 205 each time the signal value on the path 255 is set to be '1'.

On the other hand, the counter 207 counts the number of signal values '1', and the value which represents this number is retained in a register 208.

The number of vector elements to be processed in the vector processing is previously determined before the vector instruction is decoded. In the case where the number of vector elements is previously designated, a special instruction which is exclusively used to effect the designation is usually provided. Since the explanation of such a special instruction departs from the gist of this description, the memory port logic units will be described hereinafter by assuming that the number of vector elements to be processed has been stored in a register 211. The number of vector elements to be processed is input into the comparator circuit 209 via a path 257 and is compared with the value in the register 208. When these values become equal to each other, a signal value '1' is supplied onto a path 258. This signal is sent to the resource management circuits 4 shown in FIG. 1, indicating the completion of the processing of the memory port logic unit. On the other hand, the signal on the path 258 is inverted by an inverter 213 after passing through an OR gate 210 and is supplied onto the path 254. Therefore, when a series of addresses are generated in correspondence with the number of vector elements, the signal value of the path 255 becomes '0', and the operations of the adder 204 and the counter 207 are interrupted. A path 259 froms a transmission path for a signal which orders "temporary interruption of generation of a series of vector addresses". This temporary interruption order is effected when it is not possible for main storage to follow main storage access requests which are issued from a plurality of memory port logic units. This may occur when there is a conflict between main storage access requests.

The logical add with respect to the signal which represents temporary interruption order is obtained by the OR gate 210 so as to set the signal value of the path 254 to '0', thereby temporarily interrupting the generation of the series of vector addresses.

As described above, a series of items of vector address data and its valid signal are respectively generated on the paths 260 and 259. The logical operation shown in FIG. 3 is provided in order to read out the vector data in main storage. Also in the case of a process of writing the vector data, a series of addresses may be generated in the same manner. The vector data to be stored is controlled in such a manner that the vector register readout data is transmitted in synchronism with the generation of this series of addresses. This control may be achieved by providing the data setting timing of the registers on the basis of the valid signal on the path 255.

In accordance with the system of the present invention, it is not necessary for the multiple vector processor to ensure data transmission throughput of the memory port such as that provided in the same type of conventional processor. In other words, the processor can be constituted such that it has n sets of vector processing sections and m sets of memory ports, n and m satisfying n>m.

The multiple vector processor in accordance with the present invention enables a reduction in the amount of hardware of the storage control unit by reducing the number of memory port logic units. It is therefore possible to design a circuit for determining the priority order of main storage access requests issued from a plurality of memory ports even in a multiple vector processor whose performance is of an order of 10 GFOPS. Recently, vector processing often involves address conversion such as, at most, relocation. It is necessary to provide relocation tables in correspondence with memory port logic units. It is therefore possible to expect economical effects such as reductions in the quantities of RAM devices and their peripheral logical circuits which have relocation tables, if a system which enables a reduction in the number of memory port logic units is used.

We claim:

1. A vector processor comprising:
   a main storage for storing vector elements;
   a plurality of memory port logic units for accessing the main storage;
   a plurality of vector processing units for executing vector instruction streams different from each other, each vector processing unit having a plurality of vector registers for storing vector elements, a vector arithmetic and logic unit for vector calculations between vector elements stored in the vector registers and transmitting means for transmitting a result of the vector calculation to one of the vector registers;
   a plurality of resource management means, assigned to vector processing units different from each other, for selecting a memory port logic unit among the plurality of memory port logic units in a case where the corresponding vector processing unit performs a vector instruction stream, and for reporting which memory port logic units are selected to other resource management means, thereby the other resource management means may select another memory port logic unit in accordance with the report;
   one of said plurality memory port logic units selected by a certain resource management means of said plurality of resource management means, making use of vector elements transmitted between the main storage and a vector register included in the vector processing unit to which the certain resource management means corresponds, whereby the plurality of memory port logic units are shared by the plurality of vector processing units executing vector instruction streams different from each other.

2. A vector processor according to claim 1 wherein the certain resource management means includes decoding means for decoding a vector instruction and timing means for defining time duration when the certain resource management means is able to select one of said plurality of memory port logic units.

3. A vector processor according to claim 1 wherein each of the plurality of resource management means includes an instruction retaining means for retaining a vector instruction stream read out of the main storage and supplying the retained vector instruction stream to the decoder, a display means for displaying an opened and closed status of each memory port logic unit means for renewing the display means upon receiving a report from other resource management means.

4. A vector processing device for a plurality of vector processing units of a multiple vector processor comprising:
   a main storage for storing vector elements;
   a plurality of memory port logic units for accessing the main storage which are shared by the multiple vector processing units, the memory port logic units including means for generating a series of addresses needed to realize the particular processing demanded by an instruction and thereafter to issue an access request to the main storage;
   a plurality of resource management circuits to manage the use of the plurality of memory port logic units wherein the plurality of resource managements circuits share information representative of the availability for use of at least one of the plurality of memory port logic units; and,
   a switching means wherein an in-use signal from one of the plurality of memory port logic units will cause another one of the plurality of memory port logic units to be chosen for parallel processing of different information streams.

* * * * *